United States Patent Office 3,181,114
Patented Apr. 27, 1965

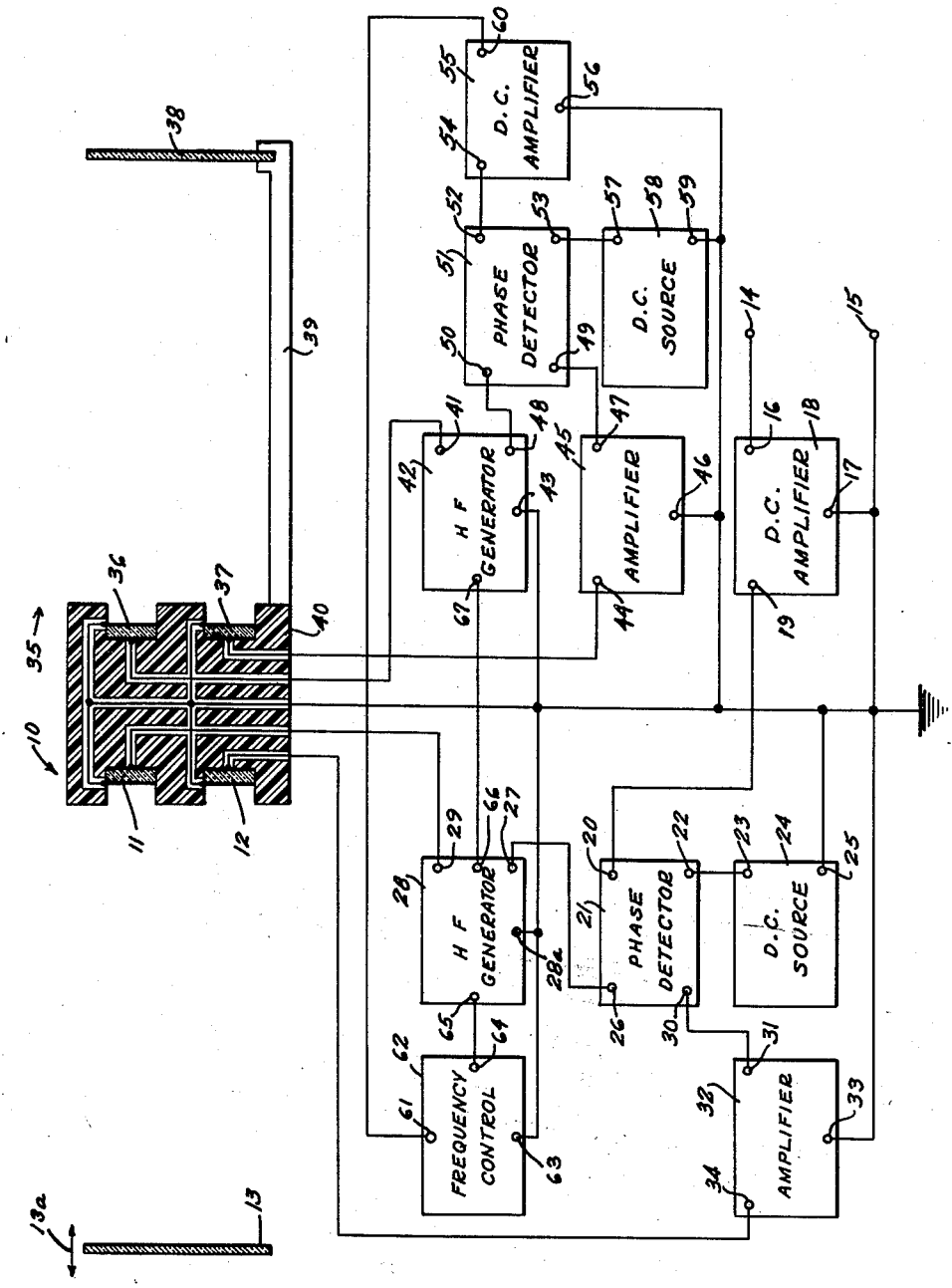

3,181,114
ULTRASONIC DISTANCE MEASUREMENT
METHOD AND APPARATUS
Clyde E. Hallmark, New Haven, Ind., assignor, by mesne assignments, to The Bunker-Ramo Corporation, Stamford, Conn., a corporation of Delaware
Filed July 26, 1960, Ser. No. 45,436
9 Claims. (Cl. 340—1)

This invention relates to an ultrasonic distance measurement system and more particularly to a system which has an extremely high accuracy despite variations in atmospheric conditions.

The accuracy of the system of the invention is so high that it can be used in positional control systems such as employed in control of machine tools. In such systems, it is necessary to sense the position, either in absolute or incremental distances, of the controlled member. An electrical signal is derived from the sensing means. The signal is then compared in value to a command signal and the difference signal becomes the servo actuating or error signal.

A number of different types of transducers have been employed in the machine tool control art, including the magnetic coupled transformer, the lead screw with differential transformer, the optical screen or grading and the rack and pinion with gear driven resolver. Each of such types has advantages and disadvantages over the others, but all have a common disadvantage. In particular, all are extremely expensive, especially in applications to large machines in which traverse distances may be five to ten feet. The reason is that all of such types employ one or another form of physical measuring device which must be of a dimension at least equal to the largest distance to be measured and the physical device must be of course be fabricated.

It is well known that ultrasonic energy may be employed to measure distance. Three types of systems have been used. In one type of system, the distance is measured by measuring the elapsed time between the sending of a short pulse of ultrasonic energy and the receipt thereof. This method is similar to the pulse radar method. In another type of system, a frequency modulated wave is sent out, and the distance is measured by determining the shift and frequency between transmitted and reflected waves. In a third type of system, an incremental distance is measured by comparing the phase of transmitted and reflected waves.

Such ultrasonic systems do not have the disadvantages of the other types of transducers mentioned above, but have heretofore had the disadvantage of not having the extreme accuracy which is desirable in certain applications such as in the machine tool control art. This invention was evolved with the object of providing an ultrasonic distance measuring system having a high degree of accuracy.

This invention involves an attack upon a fundamental difficulty existing in attempting to obtain accuracy in ultrasonic distance measuring systems. In such systems, the ultrasonic energy must be transmitted through the atmosphere. The velocity of transmission of ultrasonic energy through the atmosphere is ordinarily assumed to be substantially constant. Actually, however, it changes appreciably with variations in atmospheric conditions such as variations in temperature, pressure, humidity, carbon dioxide content, etc. For example, the velocity of transmission through air is changed by 0.38% per degree centigrade at 25° C., zero sea level barometer, zero $CO_2$ and RH. Such velocity variations result in inaccuracies which have prevented practical application of the ultrasonic methods in many applications such as in the machine tool control art.

According to this invention, a compensating signal is derived by measurement of the speed of transmission of ultrasonic waves between two points at a fixed distance apart and is applied to the ultrasonic distance measuring apparatus to compensate the apparatus for variations in temperature, pressure, humidity, carbon dioxide content, etc.

According to a more specific feature of the invention, the compensating signal is so applied as to control the rate or frequency at which the ultrasonic energy is sent out in the distance measuring system. With this arrangement, the effective wave length is maintained substantially constant.

The compensating signal producing system is preferably of a type in which a phase detector is used to measure the phase difference between transmitted and received signals. The output of the phase detector is balanced against a reference signal and is preferably used to control the rates at which ultrasonic energy is sent out in both the main system and the compensation system. Thus a closed loop system is provided in which the effective wave length is maintained substantially constant. This type of system is highly stable in operation.

This invention contemplates other objects, features and advantages which will become more fully apparent in the following detailed description taken in conjunction with the accompanying drawing in which the single figure is a diagrammatic illustration of a preferred form of distance measurement system constructed in accordance with the principles of this invention.

Referring to the drawing, reference numeral 10 generally designates an incremental distance measurement system which comprises a transmitting crystal 11 and a receiving crystal 12. The transmitting crystal 11 transmits a beam of ultrasonic waves toward a member 13 which is movable toward and away from the crystals 11, 12 as indicated by the double arrow 13a.

When the member 13 is moved toward or away from the crystals 11, 12, the relative phase of the transmitted and received signals undergoes a change. This change is used to produce a direct current output signal at output terminals 14, 15. The output signal may be used in a number of ways. For example, the member 13 may be attached to a controlled member in a machine tool system. The output signal at terminals 14, 15 may be compared in value to a command signal and the resulting difference signal becomes a servo actuating or error signal.

The output terminals 14 and 15 are connected to terminals 16 and 17 of a D.C. amplifier 18, the terminal 17 being grounded along with the terminal 15. The amplifier 18 has an input terminal 19 connected to an output terminal 20 of a phase detector 21. Another terminal 22 is connected to one terminal 23 of a D.C. source 24 having a second terminal 25 connected to ground, the output voltage of the phase detector 21 being developed between terminals 20 and 22. Thus the D.C. source is connected in series with the output of the phase detector 21. It provides a reference voltage.

One input terminal 26 of the phase detector 21 is connected to a first output terminal 27 of a high frequency generator 28 having a grounded terminal 28a. The high frequency generator 28 has a second output terminal 29 connected to one electrode of the transmitting crystal 11, the other electrode thereof being grounded. Another input terminal 30 of the phase detector 21 is connected to an output terminal 31 of an amplifier 32 having a grounded terminal 33. An input terminal 34 of the amplifier 32 is connected to one electrode of the receiving crystal 12, the other electrode being connected to ground.

In operation of the circuit as thus far described, the high frequency generator energizes the crystal 11 which transmits a beam of ultrasonic waves toward the member 13. The waves are reflected from the member 13 and received by the receiving crystal 12 which thereby produces a weak electrical signal. This signal is amplified by the amplifier 32 and applied to the phase detector 21 which compares the phase of the received signal with that of the transmitted signal. The output of the phase detector is compared with a reference voltage from the source 24 to develop an output voltage which is amplified by amplifier 18 and applied to the output terminals 14, 15.

By way of illustrative example, and not by way of limitation, the high frequency generator 28 may be operated at a frequency of 130 kc., and the ultrasonic waves may have a wave length on the order of 0.1 inch. With a phase comparison accuracy of 1°, the resulting distance measurement may be made to a resolution of approximately 0.0002 inch, a degree of accuracy which is satisfactory in many machine tool applications. This degree of accuracy is, however, possible only if the velocity of propagation of the ultrasonic waves is constant and, as explained above, the velocity of transmission of waves through the atmosphere varies to a substantial degree with variations in atmospheric conditions such as variations in temperature, pressure, humidity, carbon dioxide content, etc.

According to this invention, means are provided for measuring the velocity of transmission of the waves through the atmosphere and for applying a compensating signal to the distance measurement system. The compensation system is generally indicated by reference numeral 35 and in many respects, it is similar to the system 10. In particular, it comprises a transmitting crystal 36 and a receiving crystal 37 adapted to transmit and receive a beam of ultrasonic waves toward and from a member 38. The member 38 is supported in fixed relation to the crystals 36, 37. As diagrammatically illustrated, member 38 is affixed to one end of a connecting member 39 which is affixed at its other end to a block 40 of insulating material which supports crystals 36, 37. Block 40 may also support crystals 11, 12 as illustrated.

The transmitting crystal 36 has one electrode connected to ground and the other electrode thereof connected to an output terminal 41 of a high frequency generator 42 having a grounded terminal 43. The receiving crystal 37 has one electrode connected to ground and the other electrode thereof connected to an input terminal 44 of an amplifier 45 having a grounded terminal 46. An output terminal 47 of the amplifier 45 and a second output terminal 48 of the high frequency generator 42 are respectively connected to input terminals 49 and 50 of a phase detector 51. In operation, the phase detector 51 produces a direct current output voltage at terminals 52 and 53 corresponding in magnitude and polarity to the phase difference between the transmitted and received signals at the crystals 36, 37. Under constant atmospheric conditions, the output of the phase detector 51 is constant, the member 38 being supported in fixed relation to the crystals 36, 37. However, if the atmospheric conditions should change to change the velocity of sound transmission, the output of the phase detector 51 is changed in corresponding degree.

Output terminal 52 of the phase detector 51 is connected to an input terminal 54 of a D.C. amplifier 55 having a grounded terminal 56. Terminal 53 is connected to a terminal 57 of a D.C. source 58 having a grounded terminal 59. The output of the phase detector 51 is thus connected in series with the output of the D.C. source 58 and the difference between the two voltages is applied to the D.C. amplifier 55. D.C. amplifier 55 has an output terminal 60 connected to an input terminal 61 of a frequency control circuit 62 having a grounded terminal 63. The circuit 62 has an output terminal 64 connected to an input terminal 65 of the high frequency generator 28. In operation, the control circuit 62 responds to changes in the output of the D.C. amplifier 55 produced by changes in the velocity of transmission of the waves through the atmosphere. The control circuit 62 controls the frequency of the high frequency generator 28 in a manner to compensate for the changes in velocity of transmission, and thus to produce a substantially constant wave length. The frequency control circuit 62 may be of any well known type. It may, for example, include a reactance tube circuit.

A further important feature of the invention is in the provision of a feed-back circuit which further increases the accuracy and stability of the system. In particular, the high frequency generator 28 has a third output terminal 66 connected to an input terminal 67 of the high frequency generator 42. Through this connection, the operation of the two high frequency generators 28 and 42 is synchronized. Preferably, they are operated at the same frequency.

Through the interconnection of the high frequency generators 28, 42 a closed loop is provided which increases the required degree of amplification in the amplifier 55 but greatly increases the accuracy and stability of the system.

Various modifications will occur to those skilled in the art. For example, the echo or reflection method need not be employed and the receiving crystal 12 might be mounted on the movable member to directly receive waves from the transmitting crystal 11. A similar change may be made with respect to the crystals 36, 37. It is possible to operate the high frequency generator 42 at a frequency equal to an integer multiple or sub-multiple of the frequency of the generator 28 and it might also be possible to use a single generator to supply signals to both transmitting crystals and both phase detectors. Preferably, however, the illustrated arrangement is used because of the isolation of the circuits.

The system may be used for measuring distance only or for measurement of any distance function. For example, by measurement of the rate of change of distance, it may be used for measurement of the relative velocity of two points. Or it may be used for measurement of acceleration (the rate of change of velocity) or for the measurement of the rate of change of acceleration or for the measurement of any quantity which is a function of distance. The term "distance function" as used herein is therefore intended to include distance or any other quantity which is a function of distance.

Other modifications and variations may be made without departing from the spirit and scope of the novel concepts of this invention.

I claim as my invention:

1. In an ultrasonic distance measuring system including means for sending out ultrasonic waves at a certain rate, means movable in accordance with a distance to be measured for reflecting said waves, means for receiving said waves after transmission through a variable distance, and means responsive to the transmitted and received waves for producing a signal varying according to said distance, means for producing a compensating signal corresponding to the velocity of ultrasonic wave transmission between two points spaced a fixed distance apart, and means for applying said compensating signal to said system to control said rate and compensate said system for variations in the velocity of ultrasonic wave transmission.

2. In an ultrasonic distance measuring system arranged to measure a distance function as to two spaced points, compensation means comprising means for sending out ultrasonic energy at a certain rate, means for reflecting said waves, means for receiving said energy after transmission and reflection through a fixed distance, phase detector means responsive to the transmitted and received waves for producing a compensating signal corresponding to the velocity of ultrasonic wave transmission, and means for applying said compensating signal to said system to compensate said system for variations in the velocity of ultransonic wave transmission.

3. In an ultrasonic distance measuring system arranged to measure a distance function as to two spaced points, compensation means comprising means for transmitting ultrasonic energy at a certain rate, means for reflecting said waves, means for receiving said energy after transmission and reflection through a fixed distance, phase detector means responsive to the transmitted and received energy, a reference signal source, means connecting said reference signal source in series with the output of said phase detector to develop a compensating signal, and means for applying said compensating signal to said system to compensate said system for variations in the velocity of ultrasonic wave transmission.

4. In an ultrasonic distance measuring system including first transmission means for sending out ultrasonic energy at a certain rate, first means for reflecting said waves, first receiving means for receiving the ultrasonic energy after transmission through a variable distance, and first phase detector means responsive to said transmitted and received signals to produce an output signal corresponding to said variable distance, and compensation means comprising second transmission means for sending out ultrasonic waves at a rate proportional to said certain rate, second means for reflecting said waves, means for receiving the ultrasonic energy sent out by said second transmission means after transmission through a fixed distance, second phase detector means coupled to said second transmitting means and said second receiving means to develop a compensating signal, and means for applying said compensating signal to said transmission means to control the rates at which ultrasonic energy is sent out by both said first and second transmission means.

5. In an ultrasonic distance measuring system, a phase detector having a pair of inputs, a high frequency generator connected to one of said inputs, an amplifier having an output connected to the other of said inputs, first transducer means coupled to said high frequency generator for sending out ultrasonic waves, means for reflecting said waves, second transducer means connected to the input of said amplifier and arranged to receive said waves after transmission through a variable distance, means for producing a signal corresponding to the velocity of ultrasonic wave transmission between points spaced a fixed distance apart, and frequency control means responsive to said signal and coupled to said high frequency generator to control the frequency of operation thereof.

6. In an ultrasonic distance measuring system arranged to measure a distance function as to two spaced points, a phase detector having a pair of inputs, a high frequency generator connected to one of said inputs, an amplifier having an output connected to the other of said inputs, a first transducer coupled to said high frequency generator and arranged to transmit ultrasonic waves, means for reflecting said waves, a second transducer connected to the input of said amplifier and arranged to receive said waves after transmission through a fixed distance, and means responsive to the output of said phase detector for applying a compensating signal to said system to compensate said system for variations in the velocity of ultrasonic wave transmission.

7. In an ultrasonic distance measuring system arranged to measure a distance function as to two spaced points, a phase detector having a pair of inputs, a high frequency generator connected to one of said inputs, an amplifier having an output connected to the other of said inputs, a first transducer coupled to said high frequency generator and arranged to transmit ultrasonic waves, means for reflecting said waves, a second transducer connected to the input of said amplifier and arranged to receive said waves after transmission through a fixed distance, a direct current amplifier having an input coupled to the output of said phase detector, means coupling the output of said direct current amplifier to said system for compensating said system for variations in the velocity of ultrasonic wave transmission.

8. In an ultrasonic distance measuring system arranged to measure a distance function as to two spaced points, a phase detector having a pair of inputs, a high frequency generator connected to one of said inputs, an amplifier having an output connected to the other of said inputs, a first transducer coupled to said high frequency generator and arranged to transmit ultrasonic waves, means for reflecting said waves, a second transducer connected to the input of said amplifier and arranged to receive said waves after transmission through a fixed distance, and means coupling the output of said phase detector to said high frequency generator to control the frequency of operation thereof to compensate said system for variations in the velocity of ultrasonic wave transmission.

9. A method of measuring distance between at least two points which comprises transmitting a first sonic wave from a first transmitting point toward a first sonically reflecting surface movable in accordance with the distance to be measured, receiving the sonic wave reflected from said surface at a first receiving point in fixed relation to said transmitting point, developing a first electrical signal corresponding to the magnitude and sense of the phase difference between the waves transmitted and received at said points, transmitting a second sonic wave from a second transmitting point toward a second sonically reflective surface in fixed relation to said second transmitting point, receiving the sonic wave reflected from said second reflection surface at a second receiving point in fixed relation to said second transmitting point, developing a second electrical signal corresponding to the magnitude and sense of the phase difference between the waves transmitted and received at said second transmitting and receiving points, and controlling the frequency of said first sonic wave in proportion to said second electrical signal.

References Cited by the Examiner

UNITED STATES PATENTS

| | | | |
|---|---|---|---|
| 2,480,646 | 8/49 | Grabau | 340—6 |
| 2,753,542 | 7/56 | Rod et al. | 340—3 |
| 2,841,775 | 7/58 | Saunders | 340—3 |
| 2,865,196 | 12/58 | Bordenave | 73—67.6 X |
| 2,960,678 | 11/60 | Beard | 340—1 |
| 2,985,018 | 5/61 | Williams | 340—1 X |

CHESTER L. JUSTUS, *Primary Examiner.*